(12) United States Patent
Kim et al.

(10) Patent No.: US 9,831,936 B2
(45) Date of Patent: Nov. 28, 2017

(54) USER TERMINAL OF MULTI-HOP RELAY SYSTEM AND METHOD FOR APPLYING NON-ORTHOGONAL MULTIPLE ACCESS IN THE SAME

(71) Applicant: ELECTRONICS AND TELECOMMUNICATIONS RESEARCH INSTITUTE, Daejeon (KR)

(72) Inventors: Jung-Bin Kim, Seoul (KR); Woo Jin Byun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/092,700

(22) Filed: Apr. 7, 2016

(65) Prior Publication Data
US 2017/0012695 A1  Jan. 12, 2017

(30) Foreign Application Priority Data
Jul. 9, 2015 (KR) .................. 10-2015-0097678

(51) Int. Cl.
*H04W 40/00* (2009.01)
*H04B 7/155* (2006.01)
(Continued)

(52) U.S. Cl.
CPC ....... *H04B 7/15514* (2013.01); *H04B 1/7107* (2013.01); *H04J 11/00* (2013.01);
(Continued)

(58) Field of Classification Search
CPC .............. H04B 7/15514; H04B 1/7107; H04B 7/15592; H04W 72/12; H04W 72/00; H04W 84/047; H04J 11/00; H04L 5/0001
See application file for complete search history.

(56) References Cited

U.S. PATENT DOCUMENTS 8,340,591 B2 * 12/2012 Lin ..................... H04B 7/15507
370/315
2009/0175214 A1 * 7/2009 Sfar ..................... H04B 7/15592
370/315
(Continued)

FOREIGN PATENT DOCUMENTS

JP 2015-41941 3/2015
KR 10-2014-0125643 10/2014

OTHER PUBLICATIONS

NTT DOCOMO, Inc., DOCOMO 5G White Paper, 5G Radio Access: Requirements, Concept and Technologies, Jul. 2014; pp. 1-13.

*Primary Examiner* — Ajit Patel
(74) *Attorney, Agent, or Firm* — Kile Park Reed & Houtteman PLLC

(57) ABSTRACT

Disclosed is a method for applying non-orthogonal multiple access in a multi-hop relay system constituted by a base station, a relay, a first user terminal, and a second user terminal, including: receiving, by the first user terminal, a first data signal which the first user terminal needs to receive and a second data signal which the second user terminal needs to receive from the base station through a first phase; receiving, by the first user terminal, a third data signal from the base station through a second phase when the second data signal is relayed through the second phase by the relay; and removing an interference signal included in the third
(Continued)

data signal received through the second phase by using the second data signal which the first user terminal receives through the first phase.

7 Claims, 5 Drawing Sheets

(51) Int. Cl.
    *H04L 5/00* (2006.01)
    *H04B 1/7107* (2011.01)
    *H04J 11/00* (2006.01)
    *H04W 72/12* (2009.01)
    *H04W 84/04* (2009.01)
    *H04W 72/00* (2009.01)

(52) U.S. Cl.
    CPC ........... *H04L 5/0001* (2013.01); *H04W 72/12* (2013.01); *H04W 72/00* (2013.01); *H04W 84/047* (2013.01)

(56) References Cited

U.S. PATENT DOCUMENTS

| | | | |
|---|---|---|---|
| 2010/0003977 A1* | 1/2010 | Pinheiro | H04B 7/026 455/434 |
| 2011/0004798 A1 | 1/2011 | Kim et al. | |
| 2011/0044379 A1* | 2/2011 | Lilleberg | H04B 7/15592 375/211 |
| 2011/0116393 A1 | 5/2011 | Hong et al. | |
| 2013/0051408 A1* | 2/2013 | Saadani | H04B 7/024 370/537 |
| 2013/0072113 A1* | 3/2013 | Lee | H04B 7/15535 455/9 |
| 2013/0128802 A1* | 5/2013 | Park | H04B 7/15592 370/315 |

* cited by examiner

USER TERMINAL OF MULTI-HOP RELAY SYSTEM AND METHOD FOR APPLYING NON-ORTHOGONAL MULTIPLE ACCESS IN THE SAME

CROSS-REFERENCE TO RELATED APPLICATIONS

This application claims priority to and the benefit of Korean Patent Application No. 10-2015-0097678 filed in the Korean Intellectual Property Office on Jul. 9, 2015, the entire contents of which are incorporated herein by reference.

TECHNICAL FIELD

The present invention relates to a user terminal of a multi-hop relay system and a method for applying a non-orthogonal multiple access in the same, and more particularly, to a technology which can enhance frequency efficiency when applying a non-orthogonal multiple access (NOMA) technique in a relay system in which multiple users are present.

BACKGROUND ART

In a non-orthogonal multiple access (NOMA) technique, overlapping coding is formed with respect to multiple users and overlaps with a power domain and an overlapped signal is separated by using successive interference cancellation (SIC) at each receiving side. The NOMA technique can increase frequency efficiency by using a new domain such as the power domain. However, the NOMA technique may have a shadow zone similarly to other wireless access technologies and a problem in that the NOMA technique cannot provide sufficient coverage or a data rate desired by a user. In order to solve the problem, using the NOMA technique together with a relay technique becomes a natural extension. The relay technique can resolve the shadow zone problem, increase cell coverage, and improve the frequency efficiency. In particular, small cell build-up using a wireless relay can significantly reduce network build-up and maintenance cost. Further, a cooperative relay technique using multiple users in an idle state as a relay has an advantage in that cost can be minimized while maximizing an advantage of the relay technique.

However, when the wireless relay or the wireless small cell is used, in general, a base station and the relay do not perform simultaneous transmission in the same band due to mutual interference and perform transmission by using different frequency bands or at different time. Orthogonal transmission between the base station and the relay can deteriorate the frequency efficiency. The deterioration problem of the frequency efficiency due to the orthogonal transmission between the base station and the relay occurs even in the case of just applying the NOMA technique to a wireless relay system or a wireless small cell system.

SUMMARY OF THE INVENTION

The present invention has been made in an effort to provide a user terminal of a multi-hop relay system and a method for applying non-orthogonal multiple access in the same which enable non-orthogonal transmission using the same frequency at the same time between a wireless relay and a base station when applying the non-orthogonal multiple access to the multi-hop relay system. The technical objects of the present invention are not limited to the aforementioned technical objects, and other technical objects, which are not mentioned above, will be apparently appreciated to a person having ordinary skill in the art from the following description.

An exemplary embodiment of the present invention provides a method for applying non-orthogonal multiple access in a multi-hop relay system constituted by a base station, a relay, a first user terminal, and a second user terminal, including: receiving, by the first user terminal, a first data signal which the first user terminal needs to receive and a second data signal which the second user terminal needs to receive from the base station through a first phase; receiving, by the first user terminal, a third data signal from the base station through a second phase when the second data signal is relayed through the second phase by the relay; and removing an interference signal included in the third data signal received through the second phase by using the second data signal which the first user terminal receives through the first phase.

The second user terminal may be positioned in a shadow zone of the base station and belong to a communication range of the relay.

Another exemplary embodiment of the present invention provides a method for applying non-orthogonal multiple access in a multi-hop relay system constituted by a base station, a relay, a first user terminal, and a second user terminal, including: overlapping and transmitting, by the base station, a first data signal which the first user terminal needs to receive and a second data signal which the second user terminal needs to receive through a first phase; and transmitting, by the base station, a third data signal to the first user terminal through a second phase when the second data signal is relayed through a second phase by the relay.

The second user terminal may be positioned in a shadow zone of the base station and belong to a communication range of the relay.

When a third user not influenced by an interference signal of the relay is present in the second phase, the base station may transmit a fourth data signal to the third user through the second phase.

The third user may be a user who receives a data signal from the base station through the first phase.

A direct channel link may be present between the base station and the second user terminal.

In the transmitting of, by the base station, a third data signal to the first user terminal through a second phase when the second data signal is relayed through a second phase by the relay, the second data signal may be overlapped with the third data signal to be transmitted to the second user terminal.

When the second data signal is relayed to the second user terminal by the relay and simultaneously, the second data signal is overlapped with the third data signal to be transmitted to the second user terminal by the base station, the base station and the relay may transmit a signal so that the second data signal is aligned and received by the second user terminal by using co-phasing.

Yet another exemplary embodiment of the present invention provides a user terminal device of a multi-hop relay system constituted by a base station, a relay, a first user terminal, and a second user terminal, the user terminal device, including: a communication unit receiving, when a first data signal which the first user terminal needs to receive and a second data signal which the second user terminal needs to receive are overlapped and transmitted through a first phase by the base station, the first data signal and the second data signal; a decoding unit decoding the first data signal and the second data signal; and an interference signal removing unit removing, when the second data signal is relayed through a second phase by the relay and a third data signal is received from the base station through the second phase, an interference signal included in the third data signal received through the second phase by using the second data signal received through the first phase.

The second user terminal may be positioned in a shadow zone of the base station and belong to a communication range of the relay.

According to exemplary embodiments of the present invention, when non-orthogonal multiple access is applied to a multi-hop relay system, non-orthogonal transmission between a base station and a relay is enabled to increase frequency efficiency.

The exemplary embodiments of the present invention are illustrative only, and various modifications, changes, substitutions, and additions may be made without departing from the technical spirit and scope of the appended claims by those skilled in the art, and it will be appreciated that the modifications and changes are included in the appended claims.

Figure 1:
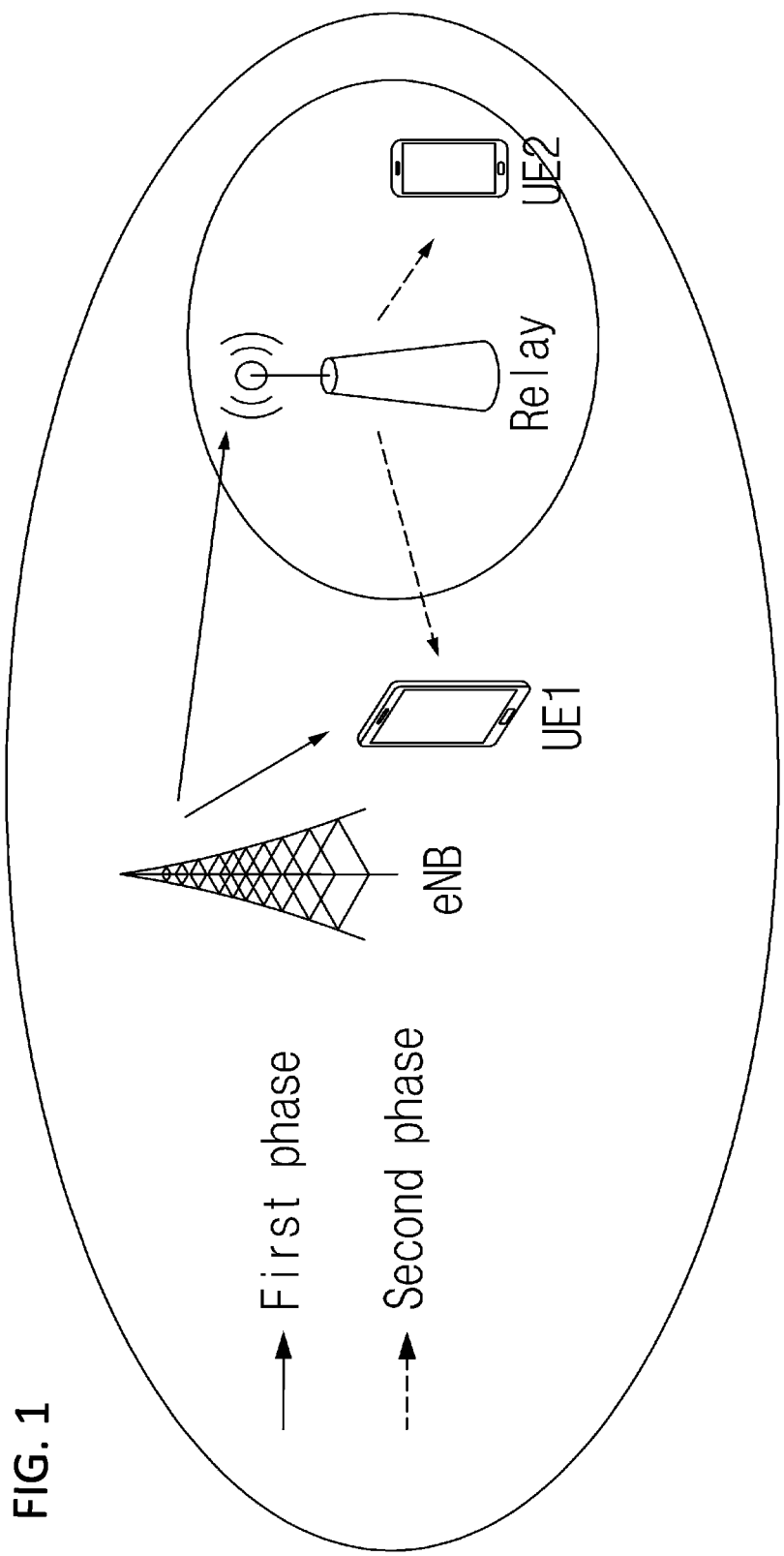
FIG. 1 is a configuration diagram of a multi-hop relay system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, some exemplary embodiments of the present invention will be described in detail with reference to the exemplary drawings. When reference numerals refer to components of each drawing, it is noted that although the same components are illustrated in different drawings, the same components are designated by the same reference numerals as possible. In describing the exemplary embodiments of the present invention, when it is determined that the detailed description of the known components and functions related to the present invention may obscure understanding of the exemplary embodiments of the present invention, the detailed description thereof will be omitted.

Terms such as first, second, A, B, (a), (b), and the like may be used in describing the components of the exemplary embodiments of the present invention. The terms are only used to distinguish a component from another component, but nature or an order of the component is not limited by the terms. Further, if it is not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

Hereinafter, exemplary embodiments of the present invention will be described in detail with reference to FIGS. 1 to 5.

FIG. 1 is a configuration diagram of a multi-hop relay system according to an exemplary embodiment of the present invention.

The multi-hop relay system of FIG. 1 as one example is a downlink wireless system in which a base station eNB, a relay, a first user terminal UE1, and a second user terminal UE2 are present. In this case, a non-orthogonal multiple access (NOMA) technique is applied to the multi-hop relay system according to the exemplary embodiment of the present invention to perform communication.

It is assumed that the first user terminal UE1 is present at a location where the first user terminal UE1 may directly receive a signal from the base station eNB and the second user terminal UE2 is positioned in a shadow zone and the second user terminal UE2 may not thus directly receive the signal from the base station and is positioned in a small cell formed by a wireless relay node to receive the signal from the relay. Further, it is assumed that the half-duplex technique of the relay is achieved by the time axis and transmission power of the base station eNB is $P_b$ and transmission power of the relay is $P_r$. The first user terminal UE1 and the second user terminal UE2 intend to receive data symbol signals of $\{x_1(1), x_1(2), \ldots, x_1(n)\}$ and $\{x_2(1), x_2(2), \ldots, x_2(m)\}$ from the based station eNB, respectively.

The base station eNB overlaps and transmits the data signals $x_1(1)$ and $x_2(1)$ to be transmitted to the first user terminal UE1 and the second user terminal UE2 with power of $P_b a_1(1)$ and $P_b a_2(1)$ by using the NOMA technique in the first phase). In this case, indexes in parentheses of $x_1(1)$, $x_2(1)$, $P_b a_1(1)$, and $P_b a_2(1)$ respresent phases and for example, a case in which the number in the parentheses is "1" means the first phase and a case in which the number in the parentheses is "2" means the second phase. Further, $a_1(1)$ and $a_2(1)$ are weighted values for deciding power allocated to the first user terminal UE1 and the second user terminal UE2 in the NOMA technique and are $a_1(\cdot)+a_2(\cdot)=1$. Further description, a data signal $x_1(1)$ which the base station eNB will transmit to the first user terminal UE1 through the first phase is referred to as a first data signal, a data signal $x_2(1)$ which the base station eNB will transmit to the second user terminal UE2 through the first phase is referred to as a second data signal, and a data signal $x_2(1)$ which the base station eNB will transmit to the first user terminal UE1 through the second phase is referred to as a third data signal.

The relay decodes and encodes the second data signal of the second user terminal UE2, which is received from the base station eNB through the first phase and retransmits the decoded and encoded second data signal to the second user terminal UE2 through the second phase. In this case, a relay scheme of the relay may be implemented as various relay schemes including decoding and thereafter transferring the second data signal, or amplifying and thereafter transferring the second data signal.

The aforementioned assumption of the example of the multi-hop relay system as one example for describing the present invention is just exemplary and it will be appreciated by those skilled in the art that various transformations and other equivalent exemplary embodiments can be made therefrom. For example, in the example, the half duplex technique of the relay may be achieved by a frequency axis and a NOMA system in which more users are present may be considered. Further, one or more relays may be considered and the multi-hop relay system may be extended to a system considering an influence of an external interference source. A sleep user may serve as the relay.

The multi-hop relay system having such a configuration regulates that the base station may not transmit a new data signal by using a frequency band used by the relay in the second phase.

The reason is that when the first user terminal UE1 receives a new third data signal from the base station eNB through the second phase, a signal retransmitted to the second user terminal UE2 may serve as interference by the relay. Therefore, when the NOMA technique is just applied to the multi-hop relay system, the base station may not transmit a new data signal by using the frequency band used by the relay in the second phase, and as a result, the frequency efficiency may decrease.

Therefore, the present invention presents a scheme that may increase the frequency efficiency by presenting a transmission/reception scheme in which the base station may use the frequency band used by the relay in the second phase. That is, when the base station eNB transmits the new third data signal to the first user terminal UE1 in the second phase, the first user terminal UE1 removes an interference signal of the relay, which is included in the third data received from the base station eNB to use the third data by using a data signal of the second user terminal UE2, which is obtained in the first phase, thereby increasing the frequency efficiency.

Hereinafter, a method for applying the NOMA, which may increase the frequency efficiency in the multi-hop relay system according to an exemplary embodiment of the present invention, will be described with reference to FIGS. 2 and 4.

Figure 2:
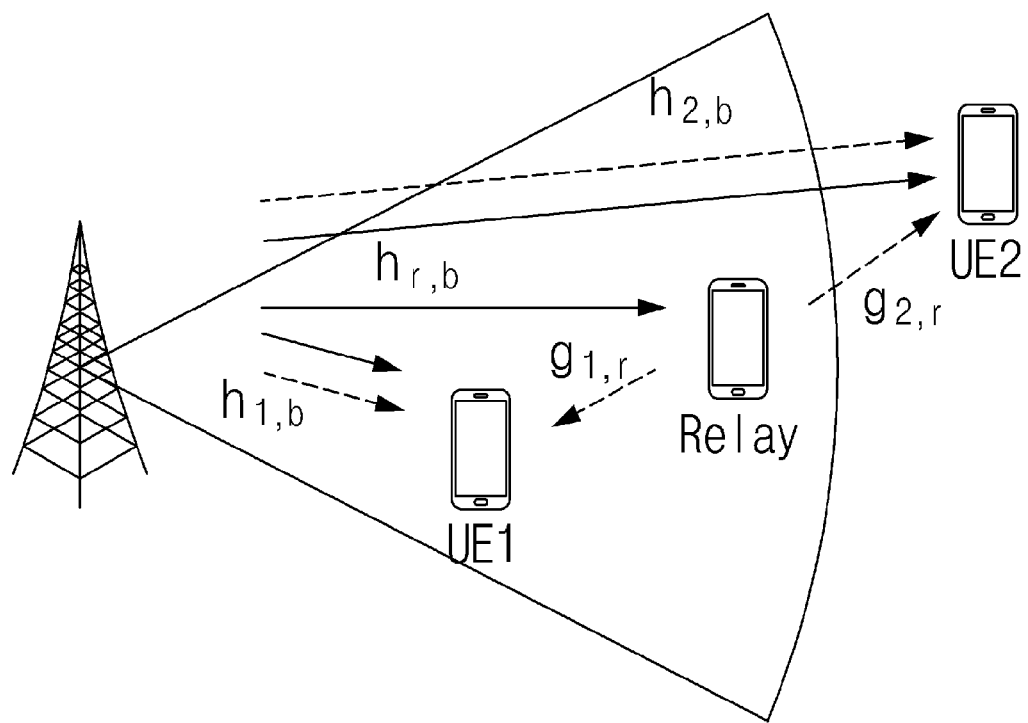
FIG. 2 is a diagram for describing a method which enables non-orthogonal transmission between a base station and a relay to increase frequency efficiency when a multiple non-orthogonal multiple access (NOMA) technique is applied to a multi-hop relay system according to an exemplary embodiment of the present invention.

FIG. 2 is a diagram for describing a method for enhancing of deterioration of frequency efficiency by a half-duplex restriction when a multiple non-orthogonal multiple access technique is applied to a multi-hop relay system according to an exemplary embodiment of the present invention. FIG. 4 is a flowchart illustrating a method for applying a multiple non-orthogonal multiple access technique to a multi-hop relay system according to an exemplary embodiment of the present invention.

Referring to FIG. 2, as illustrated in FIG. 1, in the downlink wireless system in which the base station eNB, the relay, the first user terminal UE1, and the second user terminal UE2 are present, the multiple non-orthogonal multiple access technique is applied. As described in one example of FIG. 2, it is assumed that the base station, the first user, the relay, and the second user are distributed, and as a result, the size of downlink path attenuation increases in the order of the base station-the first user terminal, the base station-the relay, and the base station-the second user terminal.

Figure 4:
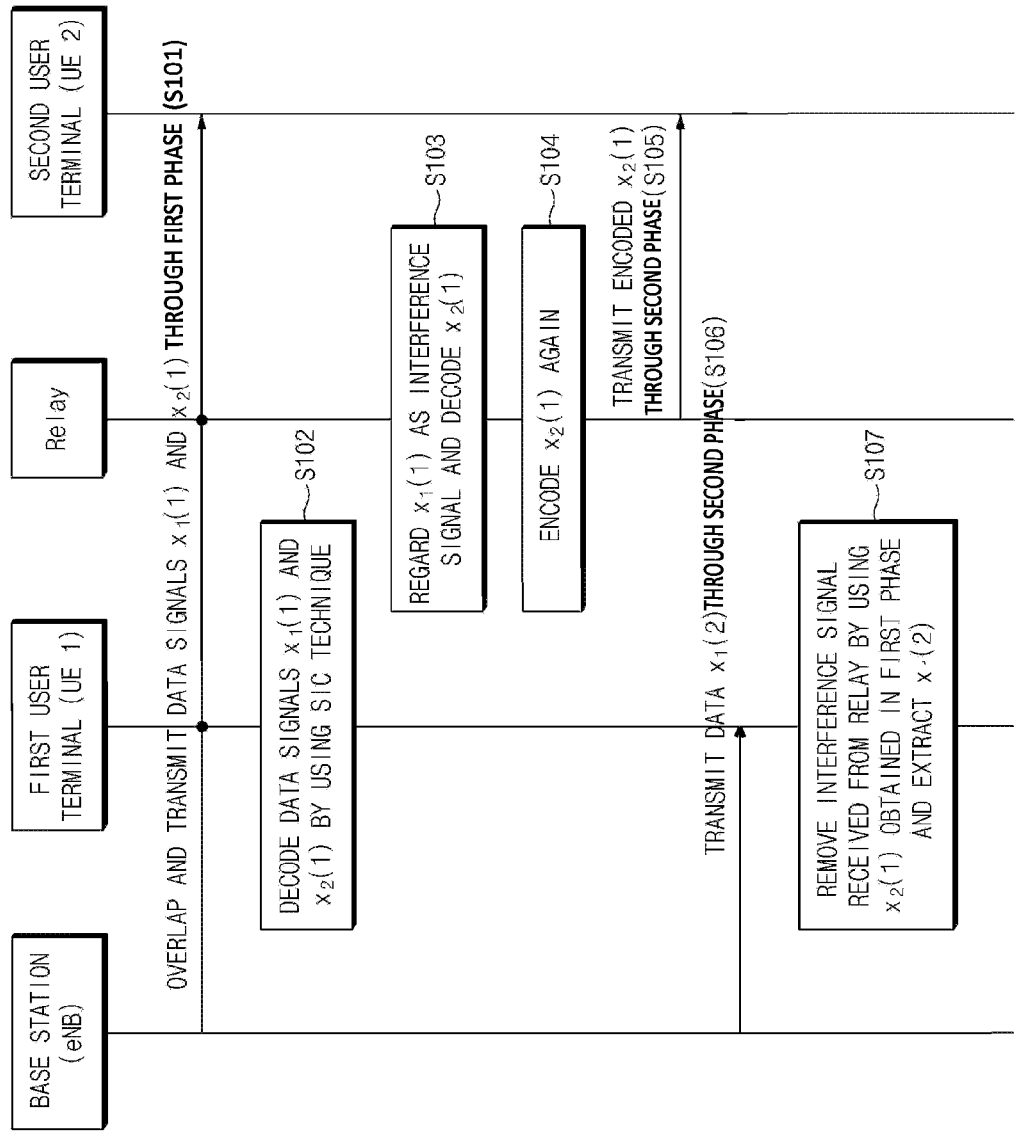
FIG. 4 is a flowchart illustrating a method for applying a multiple non-orthogonal multiple access (NOMA) technique to a multi-hop relay system according to an exemplary embodiment of the present invention.

Referring to FIG. 4, first, the base station eNB overlaps and transmits the first data signal $x_1(1)$ and the second data signal $x_2(1)$ to be transmitted to the first user terminal UE1 and the second user terminal UE2 with power of $P_b a_1(1)$ and $P_b a_2(1)$ by using the NOMA technique through the first phase (S101). In this case, the signal received by the first user terminal UE1 is $y_1(1)$ as shown in Equation 1 given below, the relay is $y_r(1)$ in Equation 1 given below, and the signal received by the second user terminal UE2 is $y_2(1)$ as shown in Equation 1 given below. Subscripts b, r, 1, and 2 represent the base station, the relay, the first user terminal, and the second user terminal, respectively.

Thereafter, the first user terminal UE1 decodes the first data signal $x_1(1)$ and the second data signal $x_2(1)$ by using a successive interference cancellation (SIC) technique (S102).

Meanwhile, when it is assumed that a technique in which the relay decodes and relays the signal is used, the relay regards the first data signal $x_1(1)$ as the interference signal in the received signal $y_r(1)$ of Equation 1 and decodes the second data signal $x_2(1)$ according to a decoding scheme of the NOMA technique (S103).

Thereafter, in the second phase, the relay encodes the second data signal $x_2(1)$ again (S104) and retransmits the encoded second data signal $x_2(1)$ to the second user terminal UE2 with power of $P_r$(S105).

Simultaneously, the base station eNB transmits the third data signal $x_1(2)$ to the first user terminal UE1 with power of $P_b a_1(2)$ (S106). In FIG. 4, it is disclosed that processes S105 and S106 are sequentially performed, but it is just one example and processes S105 and S106 may be simultaneously performed.

In this case, the signals received by the first user terminal UE1 and the second user terminal UE2 are as shown in Equation 2 given below. That is, $y_1(2)$ represents the signal received by the first user terminal UE1 and $y_2(2)$ represents the signal received by the second user terminal UE2.

$$y_1(2) = h_{1,b}\sqrt{P_b a_1(2)}x_1(2) + g_{1,r}\sqrt{P_r}x_2(1) + n_1(2)$$

$$y_2(2) = g_{2,r}\sqrt{P_r}x_2(1) + h_{2,b}\sqrt{P_b a_1(2)}x_1(2) + n_2(2) \qquad \text{[Equation 2]}$$

Thereafter, the first user terminal UE1 may receive the new third data signal $x_1(2)$ which is not interfered from the relay by removing a term $g_{1,r}\sqrt{P_r}x_2(1)$ which is the interference signal from the relay from $y_1(2)$ as the received signal of the first user terminal UE1 in Equation 2 by using the second data signal $x_2(1)$ obtained in the first phase (S107).

Figure 3:
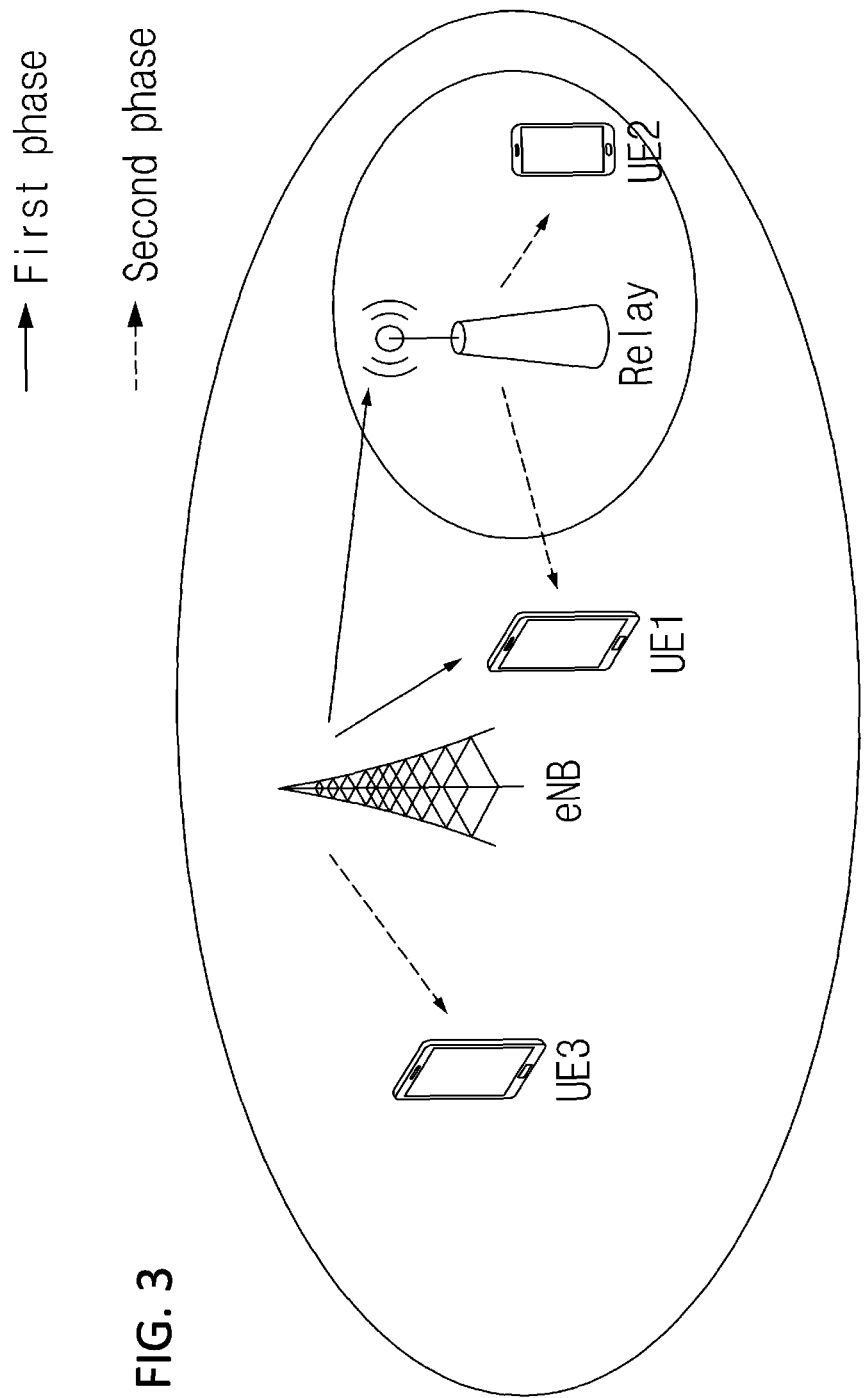
FIG. 3 is a diagram for describing a method which enables non-orthogonal transmission between a base station and a relay to increase frequency efficiency when a multiple non-orthogonal multiple access (NOMA) technique is applied to a multi-hop relay system according to another exemplary embodiment of the present invention.

In FIGS. 2 and 4, an example of the multi-hop relay system constituted by the first user terminal UE1 which may directly receive the signal from the base station eNB and the second user terminal UE2 which is present in the shadow zone of the base station is illustrated and is primarily described, but the present invention is not limited thereto and as illustrated in FIG. 3, the NOMA technique which may increase the frequency efficiency in the present invention may be applied even to a case in which a third user terminal UE3 is present.

FIG. 3 is a diagram for describing a method which enables non-orthogonal transmission between a base station and a relay to increase frequency efficiency when a multiple non-orthogonal multiple access technique is applied to a multi-hop relay system according to another exemplary embodiment of the present invention.

As illustrated in FIG. 3, when the second user terminal UE2 is present in the shadow zone and the third user terminal UE3 is positioned in an area which is not influenced by the interference signal of the relay in the second phase, the base station eNB relays a fourth data signal $x_3(2)$ to the third user terminal UE3 in step S106 of FIG. 4.

In FIG. 3, an example of one user terminal which is not influenced by the interference signal of the relay is disclosed, but a plurality of user terminals may be additionally present. In this case, the base station pairs multiple users which are not interfered by the relay to simultaneously transmit data signals desired by the respective users by using the NOMA technique. In this case, the paired users may be users who receive the data signals from the base station in the first phase.

Meanwhile, in the present invention when a channel link is present between the base station eNB and the second user terminal UE2, NOMA users including the second user terminal UE2 may be newly paired in the second phase so that the base station is able to transmit the new data signal in the second phase.

In the case where a direct channel link is present between the base station eNB and the second user terminal UE2, when the base station eNB transmits the new data signal in the second phase, the interference occurs, and as a result, decoding the second data signal $x_2(1)$ received by the second user terminal UE2 may be unsuccessful. Therefore, in the present invention, the NOMA users including the second user terminal UE2 may be newly paired in the second phase and the second data signal $x_2(1)$ may be transmitted again.

When NOMA users including the second user terminal UE2 are newly paired in the second phase and the second data signal $x_2(1)$ is transmitted again, the second data signal may be transmitted by using a co-phasing technique so that the second data signal $x_2(1)$ retransmitted by the relay and the second data signal $x_2(1)$ transmitted by the base station are aligned and received. The relay and the base station may multiply $$\frac{g^*_{1,r}}{|g_{1,r}|}x_2(1) \text{ and } \frac{h^*_{2,b}}{|h_{2,b}|}x_2(1)$$

by an overlapping signal formed by using the NOMA technique and transmit the result.

Figure 5:
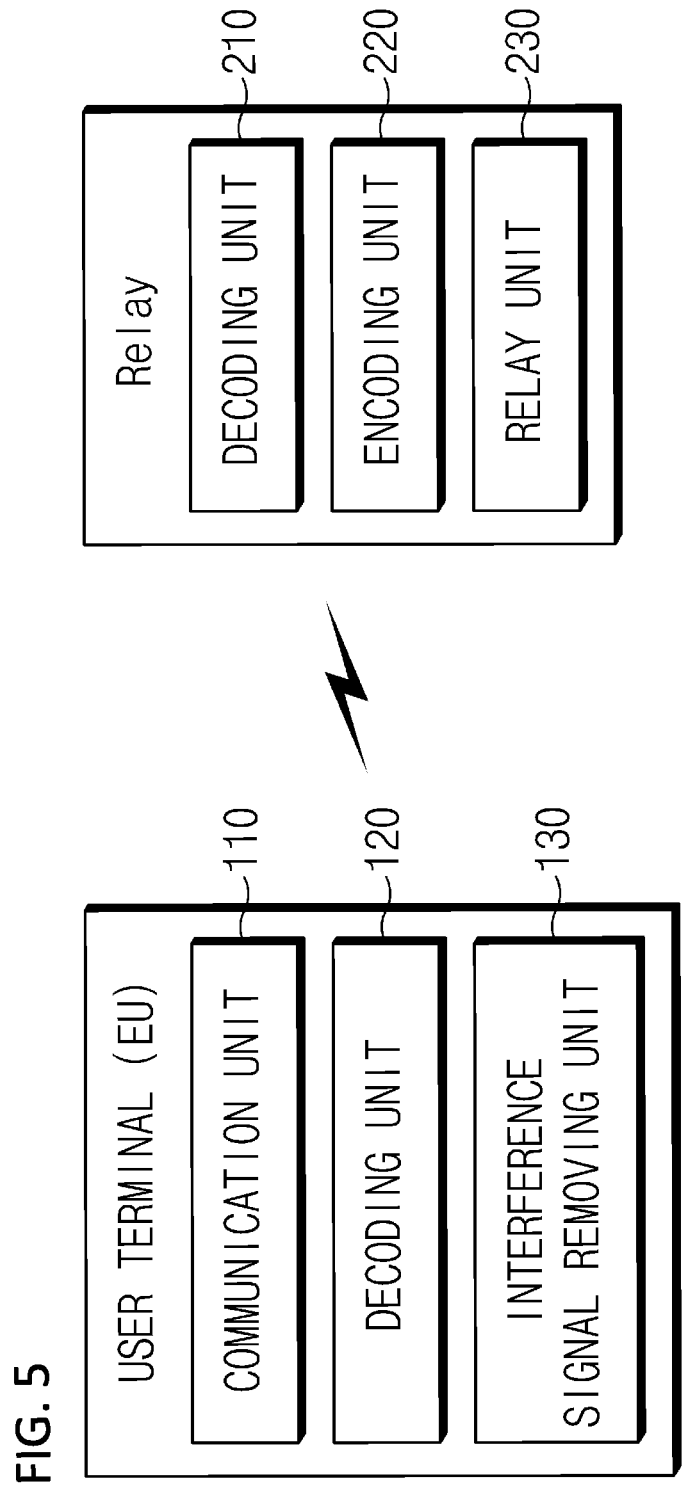
FIG. 5 is a detailed configuration diagram of a user terminal and a relay of a multi-hop relay system according to an exemplary embodiment of the present invention.

FIG. 5 is a detailed schematic configuration diagram of a user terminal and a relay of a multi-hop relay system according to an exemplary embodiment of the present invention. A user terminal UE may be any one of the first user terminal UE1 to the third user terminal UE3 of FIGS. 2 to 4, but the user terminal UE of FIG. 5 is assumed as the first user terminal UE1 of FIGS. 2 to 4 for easy description.

The user terminal UE includes a communication unit 110, a decoding unit 120, and an interference signal removing unit 130.

The communication unit 110 may perform communication with the base station eNB and the relay through the first phase or the second phase and perform communication among the user terminals. In particular, in the present invention, when a first data signal which the first user terminal UE1 needs to receive and a second data signal which the second user terminal UE2 needs to receive are overlapped and transmitted by the base station eNB through the first phase, the communication unit 110 receives the first data signal and the second data signal. Further, the communication unit 110 may receive the first data signal to a third data signal from the base station eNB and the relay through the second phase.

The decoding unit 120 decodes the first data signal to the third data signal received from the base station eNB by using an SIC technique.

When the second data signal is relayed through the second phase by the relay, in the case where the interference signal removing unit 130 receives the third data signal from the base station eNB through the second phase, the interference signal removing unit 130 removes an interference signal included in the third data signal received through the second phase by using the second data signal received through the first phase.

The relay includes a decoding unit 210, an encoding unit 220, and a relay unit 230. The decoding unit 210 regards the first data signal as the interference signal and decodes the second data signal. The encoding unit 220 encodes the second data signal and the relay unit 230 relays the second data signal received from the base station through the first phase to the second user terminal UE2 through the second phase.

As described above, in the present invention, in the multi-hop relay system, the base station simultaneously uses a frequency band used by the relay in the second phase at the time of applying the NOMA technique to transmit a new data signal, thereby significantly increasing the frequency efficiency.

The above description just illustrates the technical spirit of the present invention and various modifications and transformations can be made to those skilled in the art without departing from an essential characteristic of the present invention.

Therefore, the exemplary embodiments disclosed in the present invention are used to not limit but describe the technical spirit of the present invention and the scope of the technical spirit of the present invention is not limited by the exemplary embodiments. The scope of the present invention should be interpreted by the appended claims and it should be analyzed that all technical spirit in the equivalent range are intended to be embraced by the present invention.

What is claimed is:

1. A method for applying non-orthogonal multiple access in a multi-hop relay system constituted by a base station, a relay, a first user terminal, and a second user terminal, the method comprising:
   overlapping, by the base station, a first data signal and a second data signal through a first phase to form an overlapped signal; and
   transmitting, by the base station, the overlapped signal to the first user terminal and the second user terminal; and
   transmitting, by the base station, a third data signal to the first user terminal through a second phase when the second data signal is relayed by the relay to the second user terminal through the second phase,
   wherein the first user terminal removes an interference signal included in the third data signal received from the relay by using the second data signal of the second user terminal through the first phase.

2. The method of claim 1, wherein the second user terminal is positioned in a shadow zone of the base station and belongs to a communication range of the relay.

3. The method of claim 1, wherein when a third user terminal not influenced by the interference signal of the relay is present in the second phase, the base station transmits a fourth data signal to the third user terminal through the second phase.

4. The method of claim 3, wherein the third user terminal is a user terminal which receives a data signal from the base station through the first phase.

5. The method of claim 1, wherein a direct channel link is present between the base station and the second user terminal.

6. The method of claim 5, wherein in the transmitting of, by the base station, a third data signal to the first user terminal through the second phase when the second data signal is relayed by the relay to the second user terminal, the second data signal is overlapped with the third data signal to be transmitted to the second user terminal.

7. The method of claim 6, wherein when the second data signal is relayed to the second user terminal by the relay and simultaneously, the second data signal is overlapped with the third data signal to be transmitted to the second user terminal by the base station, the base station and the relay transmit the second data signal so that the second data signal is aligned and received by the second user terminal by using co-phasing.

* * * * *